(12) United States Patent
Cote

(10) Patent No.: US 12,227,020 B2
(45) Date of Patent: Feb. 18, 2025

(54) SYSTEM AND METHOD FOR PRECISION INKING OF MICRO-OPTIC RECESSES

(71) Applicant: Crane & Co., Inc., Dalton, MA (US)

(72) Inventor: Paul F. Cote, Barnstead, NH (US)

(73) Assignee: Crane & Co., Inc., Dalton, MA (US)

( * ) Notice: Subject to any disclaimer, the term of this patent is extended or adjusted under 35 U.S.C. 154(b) by 0 days.

(21) Appl. No.: 18/556,425

(22) PCT Filed: Apr. 22, 2022

(86) PCT No.: PCT/US2022/071874
§ 371 (c)(1),
(2) Date: Oct. 20, 2023

(87) PCT Pub. No.: WO2022/226538
PCT Pub. Date: Oct. 27, 2022

(65) Prior Publication Data
US 2024/0198713 A1 Jun. 20, 2024

Related U.S. Application Data

(60) Provisional application No. 63/178,825, filed on Apr. 23, 2021.

(51) Int. Cl.
*B42D 25/324* (2014.01)
*B41M 3/00* (2006.01)
(Continued)

(52) U.S. Cl.
CPC .......... *B42D 25/324* (2014.10); *B41M 3/008* (2013.01); *B41M 3/14* (2013.01); *B41M 7/0009* (2013.01);
(Continued)

(58) Field of Classification Search
CPC .......... B41M 3/008; B41M 3/00; B41M 3/14; B41M 7/0009; B41M 7/00; B41M 7/0081; B41M 7/009; B42D 25/378
(Continued)

(56) References Cited

U.S. PATENT DOCUMENTS

| | | | |
|---|---|---|---|
| 2010/0314861 A1 | 12/2010 | Amidror et al. | |
| 2020/0189303 A1 | 6/2020 | Martini | |
| 2021/0053381 A1* | 2/2021 | Cape | ............... G02B 17/002 |

FOREIGN PATENT DOCUMENTS

| | | | |
|---|---|---|---|
| WO | 2007060133 A1 | 5/2007 | |
| WO | 2012162057 A2 | 11/2012 | |
| WO | WO-2021034955 A1 * | 2/2021 | ............. B41M 3/14 |

OTHER PUBLICATIONS

International Search Report and Written Opinion of the International Searching Authority dated Jun. 29, 2022 in connection with International Application No. PCT/US2022/071874, 10 pages.

* cited by examiner

*Primary Examiner* — Justin V Lewis

(57) ABSTRACT

A method for inking a three-dimensional micro-optic structure includes jetting a first volume of a first radiation-curable ink having a first pigment concentration to a first portion of a three-dimensional icon layer, wherein the first portion of the three-dimensional icon layer has a first volumetric fill requirement, jetting a second volume of the first radiation-curable ink to a second portion of the three-dimensional icon layer, wherein the second portion of the three-dimensional icon layer has a second volumetric fill requirement, blading excess radiation-curable ink from the three-dimensional icon layer and radiation curing remaining radiation-curable ink.

20 Claims, 8 Drawing Sheets

(51) Int. Cl.
*B41M 3/14* (2006.01)
*B41M 7/00* (2006.01)
*B42D 25/21* (2014.01)
*B42D 25/378* (2014.01)

(52) U.S. Cl.
CPC .......... *B41M 7/0081* (2013.01); *B41M 7/009* (2013.01); *B42D 25/21* (2014.10); *B42D 25/378* (2014.10)

(58) Field of Classification Search
USPC .............. 283/67, 70, 72, 74, 85, 94, 98, 901
See application file for complete search history.

SYSTEM AND METHOD FOR PRECISION INKING OF MICRO-OPTIC RECESSES

CROSS-REFERENCE TO RELATED APPLICATIONS

This application is a 371 National Stage of International Application No. PCT/US2022/071874, filed Apr. 22, 2022, which claims priority to U.S. Provisional Patent Application No. 63/178,825, filed Apr. 23, 2021, the disclosures of which are incorporated herein by reference.

TECHNICAL FIELD

The present disclosure relates to the production of micro-optic security devices, in particular, micro-optic security devices comprising one or more layers in which pigmented material is deposited into relief structures (for example, voids, wells or recesses) of an icon layer to form micro-scale (for example, between 1-50 μm) icon features.

BACKGROUND

Hardening passports, banknotes and other documents (referred to herein as "security documents") whose constructional features include hard-to-reproduce indicia of the documents' authenticity against counterfeiting remains an ongoing source of technical challenges and opportunities for improvement in the field of security document design. Micro-optic devices, such as holograms, gratings providing color shifts and other optical effects, and synthetic magnifiers, through which a layer of icon material is viewed through an array of thousands or millions of small-scale microlenses (for example, lenses on the order of 50 micrometers in diameter), to produce an image that is dynamic (i.e., its appearance can change with viewing angle) and has the appearance of three-dimensionality, constitute popular and effective forms of hard-to-reproduce indicia of authenticity.

Such micro-optic devices are typically produced by, amongst other things, cast-curing an icon layer comprising a series of relief structures and then filling the relief structures with one or more pigmented materials, and blading off excess pigmented materials, thereby creating a high-contrast, high-resolution image pattern in the filled voids of the icon layer, which registers precisely with the pitch of layer of microlenses or other small-scale focusing elements. The tiny scale of the relief structures on icon layer presents significant manufacturing challenges, making the reproduction of the icon layer extremely difficult, if not impossible for counterfeiters and other malicious actors.

However, while the process of inking an icon layer by, in essence, extending the gravure printing techniques of flood coating a surface with a relief structure with pigmented fluid and doctor blading the coated surface to simultaneously drive the excess pigmented fluid into the relief structure and (not unlike a squeegee) remove excess pigmented fluid from the surface above the relief structure is well-understood and has been mastered to an extent to permit large-scale manufacturing of micro-optic security devices, it is not without its limitations and technical challenges. The technical challenges associated with inking an icon layer by flood coating the layer and subsequently blading the surface include streaking. In contrast to the inks used in traditional gravure printing on paper, the pigmented fluids used for inking icon layers of micro-optic security devices often comprise radiation-curable fluid polymers with high (as compared to gravure printing inks) concentrations of particles of pigment. The high pigment concentration presents an elevated risk of oversize pigment particles or clumps of pigment particles being present in the flood coat of ink applied to the surface of the icon layer. When this happens, instead of being driven into the relief structures of the icon layer during the doctor blading stage, the oversize particles or clumps of pigment particles are instead dragged across the surface of the icon layer, leaving streaks of pigment on the icon layer. Such streaking can ruin some or all of a production run.

The technical challenges associated with inking an icon layer through flood coating and doctor blading excess pigmented fluid further include the fact that the bladed fluid is typically not reusable and thus, most of the pigmented fluid used is wasted. Beyond the inefficiencies and costs associated with wasting the bulk of the applied pigmented fluid, the technical problems associated with applying an excess of pigmented fluid include the risk of pigmented fluid remaining on working surfaces of the printing machinery, where it may drip on, or otherwise compromise a production run. The limitations associated with inking an icon layer by flooding the full surface of the icon layer with pigmented fluid and then blading the excess include the fact that it is often very difficult, if not outright impossible to create multi-color icons, as all of the relief structures are fully filled by the process of inking the icon layer with a first color, leaving no room for subsequent inking with pigmented fluid of a second color.

Accordingly, developing systems and methods for inking micro-optic icon layers which provide greater control over the placement and volume of uncured pigmented material on an icon layer remains a source of technical challenges and opportunities for improvement in the art.

SUMMARY

The present disclosure illustrates embodiments of improved processes for precision inking of filled recesses of micro-optic structures.

In a first embodiment, a method for inking a three-dimensional micro-optic structure includes jetting a first volume of a first radiation-curable ink having a first pigment concentration to a first portion of a three-dimensional icon layer, wherein the first portion of the three-dimensional icon layer has a first volumetric fill requirement, jetting a second volume of the first radiation-curable ink to a second portion of the three-dimensional icon layer, wherein the second portion of the three-dimensional icon layer has a second volumetric fill requirement, blading excess radiation-curable ink from the three-dimensional icon layer and radiation curing remaining radiation-curable ink.

In a second embodiment, an apparatus for inking a three-dimensional micro-optic structure includes a jet dispenser and a controller communicatively connected to the jet dispenser, wherein the controller is configured to control the jet dispenser to dispense a first volume of a first radiation-curable ink having a first pigment concentration to a first portion of a three-dimensional icon layer, wherein the first portion of the three-dimensional icon layer has a first volumetric fill requirement, and control the jet dispenser to dispense a second volume of the first radiation-curable ink to a second portion of the three-dimensional icon layer, wherein the second portion of the three-dimensional icon layer has a second volumetric fill requirement.

In a third embodiment, a micro-optic security device includes a substrate and a three-dimensional icon layer formed on the substrate, the three-dimensional icon layer comprising a first plurality of recesses in a first portion, and a second plurality of recesses in a second portion, wherein recesses of the first plurality of recesses are filled with a radiation-curable ink having a first pigment concentration to a first volumetric fill requirement, wherein recesses of the second plurality of recesses are filled with the radiation-curable ink to a second volumetric fill requirement.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8E, discussed below, and the various embodiments used to describe the principles of the present disclosure are by way of illustration only and should not be construed in any way to limit the scope of the disclosure. Those skilled in the art will understand that the principles of the present disclosure may be implemented in any suitably arranged security document.

Although the present disclosure has been described with various embodiments, various changes and modifications may be suggested to one skilled in the art. It is intended that the present disclosure encompass such changes and modifications as falling within the scope of the claims.

Figure 1:
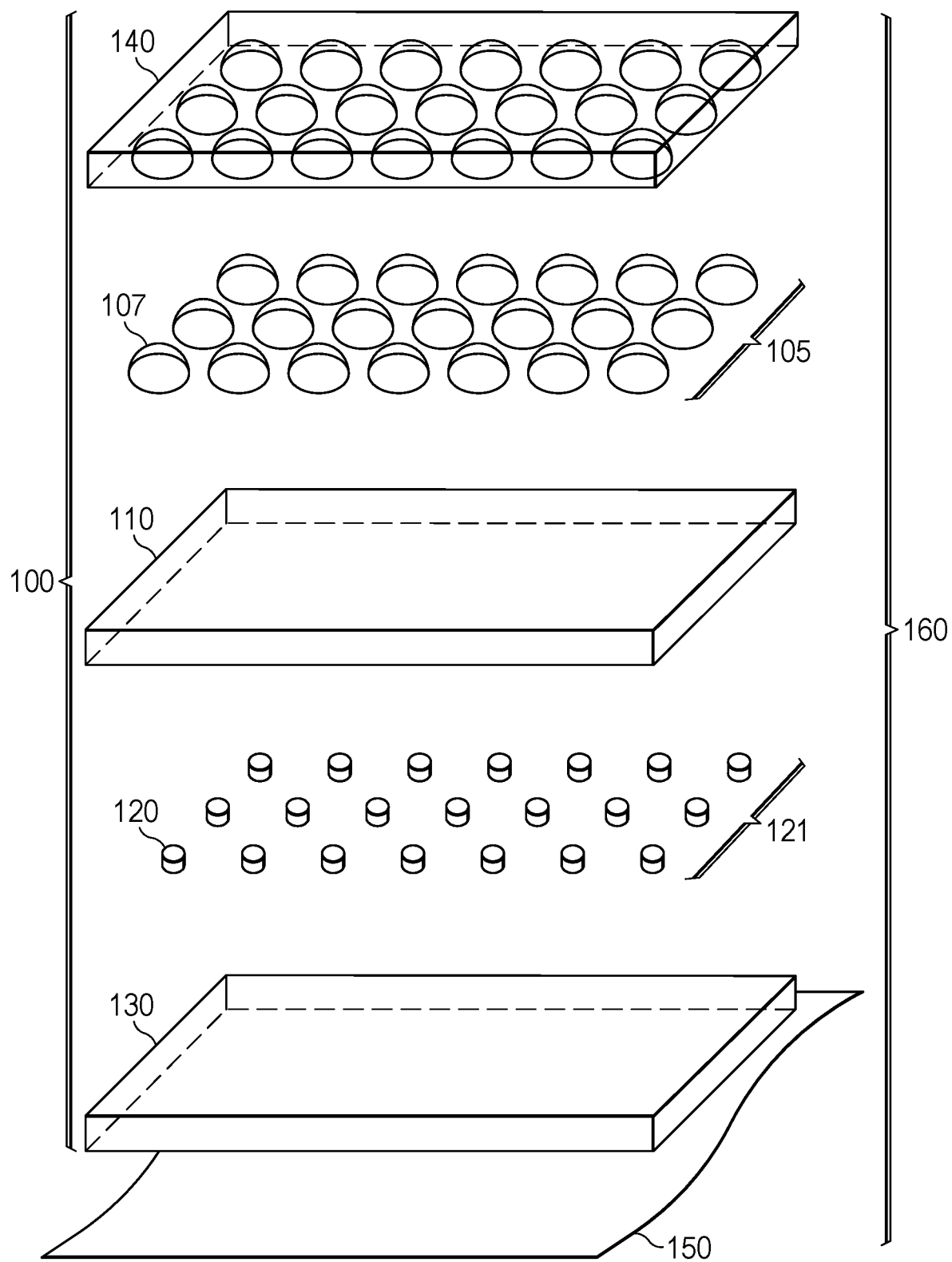
FIG. 1 illustrates, an example of a micro-optic security device according to various embodiments of this disclosure.

FIG. 1 illustrates an example of a section of an optical security device 100, which incorporates an icon structure constructed using the apparatus and methods according to certain embodiments of this disclosure.

Referring to the non-limiting example of FIG. 1, optical security device 100 comprises, a plurality of cast focusing elements 105 (including, for example, focusing element 107), and an arrangement of cast image icons 121 (including, for example, image icon 120). According to various embodiments, each focusing element of plurality of focusing elements 105 has a footprint, in which one or more image icons of arrangement of image icons 121 is positioned. According to various embodiments, each focusing element of plurality of focusing elements 105 has a diameter on the order of 50 μm, with some embodiments having diameters of 25 μm or less. Collectively, the focusing elements of plurality of focusing elements 105, magnify portions of image icons 121 to produce a moiré magnification effect (also referred to as a "synthetically magnified image" or more briefly, a "synthetic image") wherein the individually microscopic image icons are collectively magnified by the plurality of focusing elements 105 to produce an image which dynamically reacts (for example, by appearing to move, or change colors) to shifts in viewing angle. Given the small scale and tight manufacturing tolerances of the constituent structures of optical security device providing the moiré magnification effect, many malicious actors are not able to produce counterfeit versions of optical security device 100. In certain embodiments, one or more of focusing elements 105 or image icons 121 are formed through casting a resinous casting media between a casting master and a substrate.

According to certain embodiments, plurality of focusing elements 105 comprises a planar array of micro-optic focusing elements. In some embodiments, the focusing elements of plurality of focusing elements 105 comprise micro-optic refractive focusing elements (for example, plano-convex or GRIN lenses). Refractive focusing elements of plurality of focusing elements 105 are, in some embodiments, produced from light cured resins with indices of refraction ranging from 1.35 to 1.7, and have diameters ranging from 5 μm to 200 μm. In various embodiments, the focusing elements of plurality of focusing elements 105 comprise reflective focusing elements (for example, very small concave mirrors), with diameters ranging from 5 μm to 50 μm. While in this illustrative example, the focusing elements of plurality of focusing elements 105 are shown as comprising circular plano-convex lenses, other refractive lens geometries, for example, lenticular lenses, are possible and within the contemplated scope of this disclosure.

As shown in the illustrative example of FIG. 1, arrangement of image icons 121 comprises a set of image icons (including image icon 120), positioned at predetermined locations within the footprints of the focusing elements of plurality of focusing elements 105. According to various embodiments, the individual image icons of arrangement of image icons 121 comprise regions of light cured material associated with the focal path of structured light (for example, collimated UV light) passing through plurality of focusing elements 105 from a projection point associated with one or more predetermined ranges of viewing angles. According to various embodiments, the individual image icons of arrangement of image icons 121 are provided within a structured image layer, the structured image layer comprising one or more of voids, mesas, or posts, which act as retaining structures to hold micro- and nano-scale volumes of colored material.

As shown in the illustrative example of FIG. 1, in certain embodiments, optical security device 100 includes an optical spacer 110. According to various embodiments, optical spacer 110 comprises a film of substantially transparent material which operates to position image icons of arrangement of image icons 121 in or around the focal plane of focusing elements of plurality of focusing elements 105. In certain embodiments according to this disclosure, optical spacer 110 comprises a manufacturing substrate upon which one or more layers of light curable material can be applied, to form one or more of arrangement of image icons 121 or plurality of focusing elements 105.

According to various embodiments, optical security device 100 comprises one or more regions of light-cured protective material which occupy the spaces between the image icons of arrangement of image icons 121. In some embodiments, the arrangement of image icons 121 is first formed and then a layer of clear, light-curable material is applied to fill spaces between the image icons of arrangement of image icons 121 and then flood-cured to create a protective layer, which protects the image icons from being moved from their positions within the footprints of focusing elements of plurality of focusing elements 105. In certain embodiments, the light-curable material used to form arrangement of image icons 121 is a pigmented, ultraviolet (UV)-curable polymer. Examples of polymers which can be pigmented and used as a pigmented fluid for inking an icon layer include, without limitation, isodecyl acrylate, dipropylene glycol diacrylate, tripropylene glycol diacrylate, polyester tetraacrylate, trimethylolpropane triacrylate, and hexanediol diacrylate. Further examples of materials suitable for forming refractive focusing element 107 include substantially transparent or clear, colored or colorless polymers such as acrylics, acrylated polyesters, acrylated urethanes, epoxies, polycarbonates, polypropylenes, polyesters and urethanes.

In some embodiments, arrangement of image icons 121 is affixed to a second substrate 130, which operates to protect and secure arrangement of image icons 121 and provide an interface for attaching optical security device 100 to a substrate 150 as part of a security document.

In certain embodiments according to this disclosure, optical security device 100 comprises a seal layer 140. According to certain embodiments, seal layer 140 comprises a thin (for example, a 2 µm to 50 µm thick layer) of substantially clear material which interfaces on a lower surface, with focusing elements of the plurality of focusing elements 105 and comprises an upper surface with less variation in curvature (for example, by being smooth, or by having a surface whose local undulations are of a larger radius of curvature than the focusing elements) than the plurality of focusing elements 105. According to various embodiments, the upper surface of seal layer 140 is formed from a thermoplastic material which can be ultrasonically welded to a surface comprising a cellulosic material.

As shown in the non-limiting example of FIG. 1, in certain embodiments, optical security device 100 can be attached to substrate 150, to form a security document 160. According to various embodiments, substrate 150 comprises a sheet of material with at least one surface comprising cellulosic material, such as wood pulp, cotton fiber, linen fiber, flax fiber, sisal fiber, hemp fiber, Abaca fiber, Kozo fiber, Mitsumata fiber, bamboo fiber or Kenaf fiber.

While FIG. 1 provides one example of an optical security device 100 according to various embodiments, the present disclosure is not so limited. Other optical security devices which comprise at least one surface which may include precision-inked micro-structured recesses (for example, holograms, devices providing thin-film effects, devices producing diffraction-based optical effects) are within the contemplated scope of this disclosure.

Figure 2A:
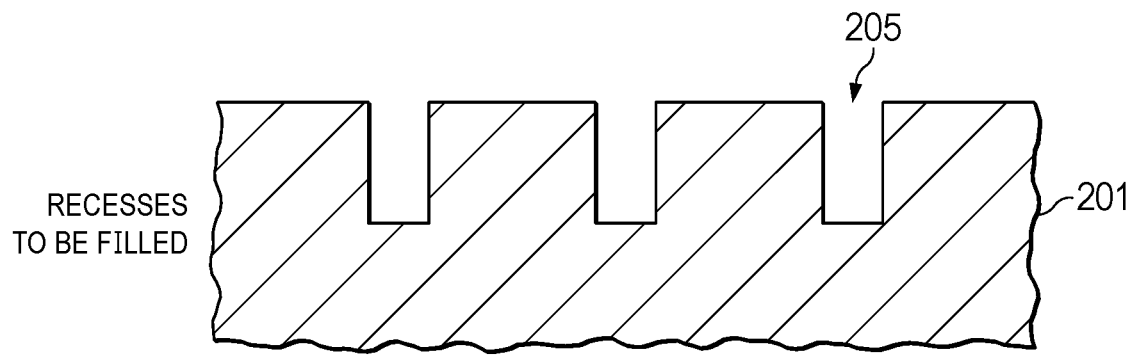
FIGS. 2A-2C illustrate an example of precision inking of a three-dimensional icon layer according to various embodiments of this disclosure.
Figure 2B:
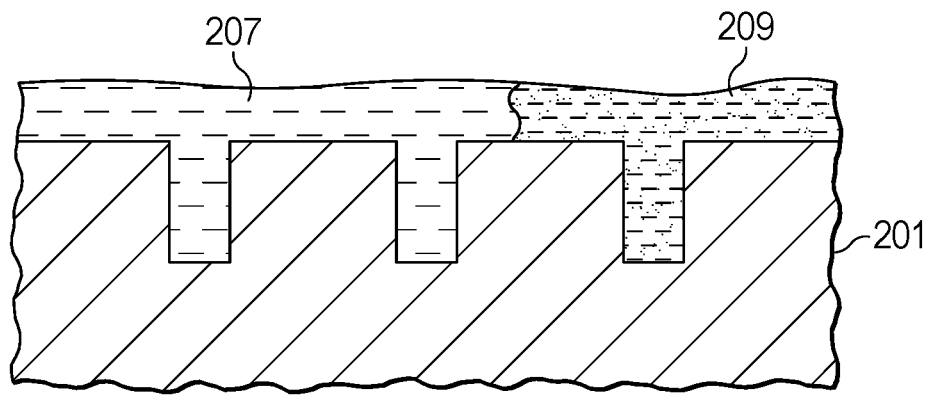
Figure 2C:
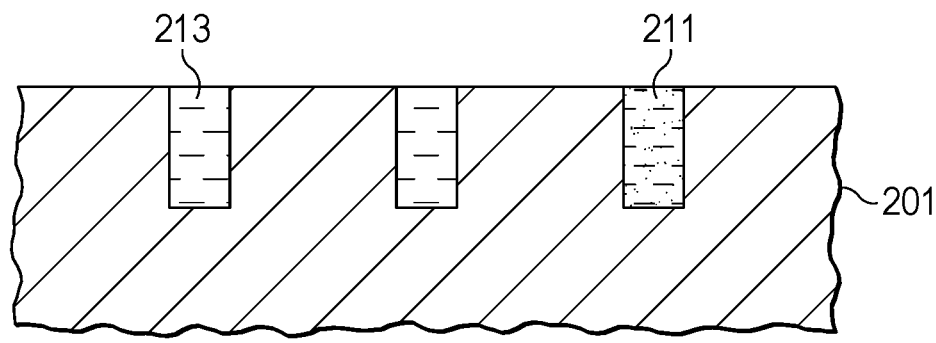

FIGS. 2A-2C illustrate aspects of precision inking of micro-structured recesses according to various embodiments of this disclosure. For convenience of cross-reference, elements common to more than one of FIGS. 2A through 2C are numbered similarly.

Referring to the illustrative example of FIG. 2A, an un-inked section of an icon layer 201 is shown in the figure. According to various embodiments, icon layer 201 comprises a section of cast-cured material (for example, a polyacrylate) which is applied on a substrate or other support, impressed with a casting master, and exposed to radiation (most typically, ultraviolet light) to form a substantially planar structure with a plurality of relief structures (for example, relief 205) which are precise negatives of raised portions of the casting master. Cast-curing manufacture permits the consistent production of tightly registered small scale (for example, between 1-50 µm wide and 10-50 µm) recesses in the icon layer, which can be filled with pigmented material to form images at a scale and level of precision not typically achievable through conventional printing techniques, such as lithography.

Turning to the explanatory example of FIG. 2B, in certain embodiments according to the present disclosure, instead of flooding icon layer 201 with a single layer of pigmented material of a first color, which, as discussed elsewhere in this disclosure, wastes fluid, and presents the risk of oversize pigment particles or clumps of pigment particles leaving streaks across the icon layer, pigmented material is adaptively jetted (for example, using an ink jet, or micro-scale jet dispenser with a piezo plunger, such as an MTA Automation jet dispenser, which can dispense drop volumes of materials of varying viscosities with drop sizes as low as 0.002 mm$^2$) at predetermined locations in the icon layer. For example, a first volume of pigmented fluid 207 of a first color is applied in a first region of icon layer 201, while a second volume of pigmented fluid 209 of a second color is applied in a second region of icon layer 201. As discussed elsewhere in this disclosure, selectively applying pigmented fluid to the icon layer (for example, by using a jet dispenser) provides multiple technical improvements over inking an icon layer by coating and blading. Use of a jet dispenser facilitates improved filtration of heavily pigmented fluid immediately prior to application. This is because certain jet dispensers cycle fluid to be dispensed through filters within the applicator, and because large particles and clumps of smaller particles tend to clog the applicator. Thus, the built-in filtration of certain jet dispensers and the fact that oversize particles often cannot pass through dispensing jets significantly mitigate streaking problems associated with oversize pigment particles and oversized clumps of pigment particles. Additionally, by dispensing pigmented fluid as small-scale drops on the icon layer, zonal application of pigmented fluids of different colors becomes readily achievable, allowing different icons to be formed on copies of the same icon structure. At a practical level, this may be highly desirable, given the high cost and technical challenges associated with designing and manufacturing casting masters for cast-curing icon layers (for example, icon layer 201). Through precision inking, multiple different security devices with single icon structure can be made by, for example, introducing new colorways, coloring effects (for example, vignette effects, as discussed herein) or through serial numbers or further indicia of authenticity. In this way, the useful lifespan of a given casting master can be extended and the security of micro-optic security devices using a given icon structure can be enhanced. Additionally, and as discussed herein, by jetting discrete volumes of pigmented fluid onto unfilled icon layer 201, the amount of pigmented fluid applied to the icon layer can be controlled and tuned in response to various implementation-specific factors, including without limitation, the density of the relief structure (i.e., some portions of icon layer may have more or deeper recesses and thus be "thirstier" than others) and real-time feedback regarding the coverage of ink on icon layer 201.

Referring to the illustrative example of FIG. 2C, subsequent to zonal application of pigmented fluid, as shown in FIG. 2B, the upper surface 211 of icon layer 201 is doctor bladed to remove excess pigmented fluid, leaving the recesses filled with pigment fluid (for example, filled recess 213). Depending on the pigmented fluid used, icon layer 201 may be irradiated (for example, with ultraviolet or infrared radiation) to induce cross-linking of pigmented fluid, transforming the pigmented fluid from a fluid to a stable solid.

Figure 3:
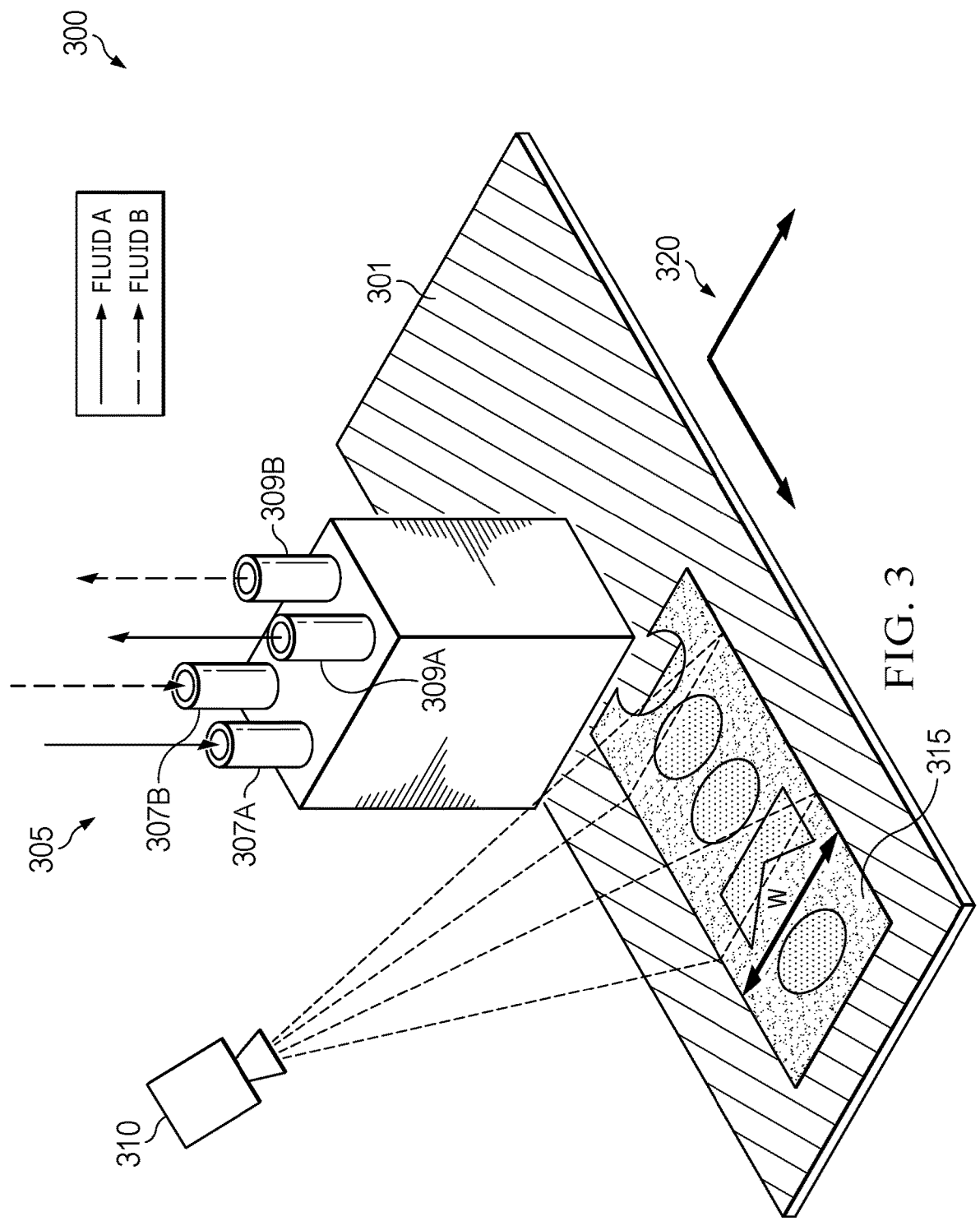
FIG. 3 illustrates an example of an apparatus for precision inking recesses of a three-dimensional icon layer according to certain embodiments of this disclosure.

FIG. 3 illustrates an example of an apparatus 300 for precision, feedback-controlled inking of relief structures of an icon layer (for example, relief structure 205 of icon layer 201 in FIG. 2) according to various embodiments of this disclosure. The example of FIG. 3 is illustrative of certain embodiments of this disclosure, and embodiments with more or fewer components or different configurations of components than shown in FIG. 3 are within the contemplated scope of this disclosure.

Referring to the illustrative example of FIG. 3 apparatus 300 comprises a micro-scale jet dispenser 305 (for example, a small-scale ink jet printing head or a piezo plunger type device) configured to dispense small volumes of pigmented fluid at coordinates specified by a control file (for example, an image file, or raster representation of an icon layer 301). According to various embodiments, micro-scale jet dispenser 305 is configured to dispense more than one type of fluid medium on a working surface. As shown in the explanatory example of FIG. 3, micro-scale jet dispenser 305 is configured to dispense two kinds of pigmented fluids (marked "Fluid A" and "Fluid B" in the figure). According to some embodiments, the pigmented fluids are circulated through a pressurized loop, entering micro-scale jet dispenser 305 through first and second inlet ports 307A and 307B, and leaving micro-scale jet dispenser 305 through first and second outlet ports 309A and 309B. In some embodiments, while waiting to be jetted onto icon layer 301, the pigmented fluids are cycled along a pressurized loop which may include one or more of a filtering stage to remove oversize particles or oversize clusters of pigment particles in the pigmented fluid mix. In some embodiments, the pressurized loop further comprises a heating stage for heating pigmented fluids to lower their viscosity.

According to various embodiments, apparatus 300 also includes one or more inspection camera(s) 310, which are configured to obtain frames of image data from which one or more parameters of the coverage of icon layer 301 with a layer 315 of the one or more pigmented fluids can be obtained. In some embodiments, inspection camera 310 may be a CMOS digital camera (or a manufacturing-specific sensor, such as a ROLL-2-ROLL® sensor) which passes frames of image data to one or more processing platforms operating as a controller for apparatus 300. Parameters of the coverage of icon layer 301 with layer 315 of pigmented fluid include, without limitation, the magnitude of a width w of applied layer 315, a color density of layer 315, and the presence or absence of highlights (indicating dry or over-coated spots) in layer 315.

In some embodiments, micro-scale jet dispenser 305 comprises a plurality of nozzles disposed in an array, so that pigmented fluid can be jetted at multiple coordinate locations on icon layer 301 without having to move micro-scale jet dispenser 305 relative to icon layer 301. Additionally, or alternatively, micro-scale jet dispenser 305 is configured to move relative to icon layer 301. In some embodiments, icon layer 301 may be disposed on a conveyor belt or otherwise moved relative to micro-scale jet dispenser 305 in a first direction 320. In some embodiments, micro-scale jet dispenser may be disposed on one or more threaded rods connectively connected to stepper motors, thereby enabling micro-scale jet dispenser 305 to move in predetermined increments along one or more of first direction 320 and second direction 325, which is perpendicular to first direction 320.

While not shown in the explanatory example of FIG. 3, the architecture described with reference to apparatus 300 is extensible and can be scaled to include multiple micro-scale jet dispensers (for example, for simultaneously inking multiple icon layers, providing additional colors of pigmented fluid, or for inking wider icon layers). Additionally, or alternatively, the architecture of apparatus 300 may, in some embodiments, apparatus 300 may comprise additional inspection cameras (for example, a downstream camera obtaining frames of image data of the icon layer post-curing) for obtaining data for tuning one or more parameters (for example, volume of fluid applied, location of fluid applied or temperature of fluid) of how or where pigmented fluid is applied to icon layer 301.

Figure 4:
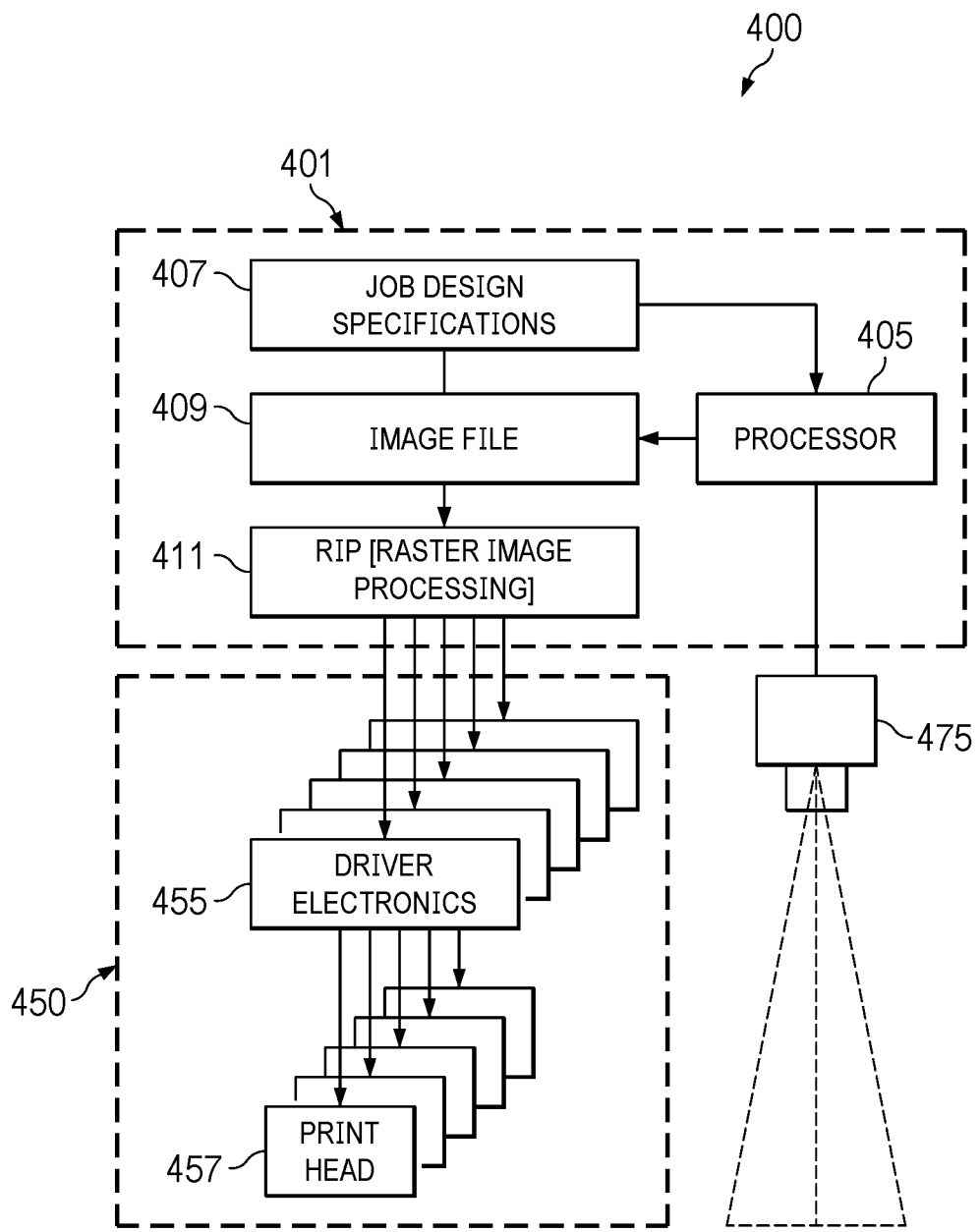
FIG. 4 illustrates, in block diagram format, an example architecture of a system for precision inking of a three-dimensional icon layer according to various embodiments of this disclosure.

FIG. 4 illustrates, in block diagram format, an example architecture 400 of a system for precision inking of an icon layer according to various embodiments of this disclosure. Referring to the illustrative example of FIG. 4, architecture 400 comprises a controller 401, one or more dispensers 450 of pigmented fluid (for example, micro-scale jet dispenser 305 in FIG. 3) and one or more inspection cameras 475 (for example, inspection camera 310 in FIG. 3), wherein controller 401 is communicatively connected to both of the one or more dispensers 450 and inspection camera 475. According to various embodiments, controller 401 comprises a processor 405 configured to execute program code stored in a non-transitory memory. In some embodiments, the non-transitory memory may be integrated with processor 405. Alternatively, or additionally, the non-transitory memory may be provided on a separate chip. A memory of controller 401 or otherwise accessible to processor 405 contains a design file 407. According to various embodiments, design file 407 comprises a file specifying a base design for a pattern of pigmented fluids on an icon layer containing a plurality of recesses for holding the pigmented fluids. As used in this disclosure, the expression "base design" comprises a mapping of locations on the icon layer to initial volumes (i.e., volumes which have not yet been modified to account for temperature effects or variations in viscosity, or other factors affecting coverage of the icon layer) of pigmented fluid to be applied to the icon layer.

As shown in FIG. 4, controller 401 receives image data from the one or more inspection cameras 475. According to various embodiments, processor 405 processes the received image data to obtain one or more visual indicia of how well pigmented fluid is being applied to the icon layer. Visual indicia of the application quality of pigmented fluid upon the icon layer include, without limitation, a measured width of a layer of pigmented fluid on the icon layer (for example, width w of layer 315 in FIG. 3), evidence of mixing or misregistration, or the presence or absence of highlights indicating dry spots or overfilled regions on the icon layer. According to some embodiments, processor 405 modulates the mappings of volumes to regions on the icon layer specified in base design file 407 based on the received image data to generate an image file 409 specifying an updated mapping of volumes of pigmented fluid to regions of the icon layer. In embodiments in which dispensers 450 are capable of dispensing more than one color of pigmented fluid, image file 409 may specify a mapping of volumes of each pigmented fluid to be applied to a given region of the icon layer.

The created image file 409 is then passed to a raster image processing module 411, which renders the image file as a raster of pixels, wherein each pixel corresponds to a unique location to which a nozzle of dispenser 450 can be positioned, and each pixel of the raster specifies a volume of a specified pigmented fluid to be dispensed at the location associated with the pixel. According to some embodiments, dispenser 450 moves to the pixel specified in the raster. According to various embodiments, a specific nozzle of dispenser 450 fires when the icon layer is advanced to a location corresponding to the row containing the pixel specified in the raster.

Referring to the non-limiting example of FIG. 4, the raster of pixels is passed to the driver electronics 455 of dispenser 450, which translates the received pixel-level raster of volumes and mappings to locations on an icon layer to control impulses to one or more print heads 457 of dispenser 450.

Figure 5A:
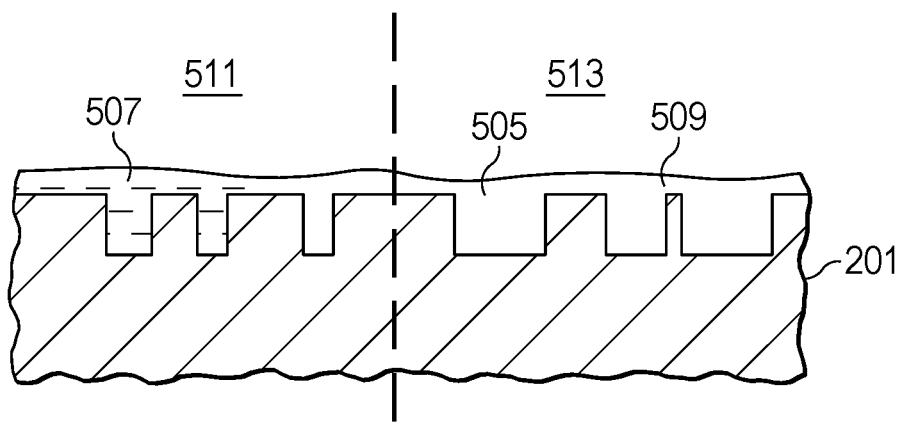
FIGS. 5A and 5B illustrate an example of zone-specific inking of recesses of a three-dimensional icon layer according to various embodiments of this disclosure.
Figure 5B:
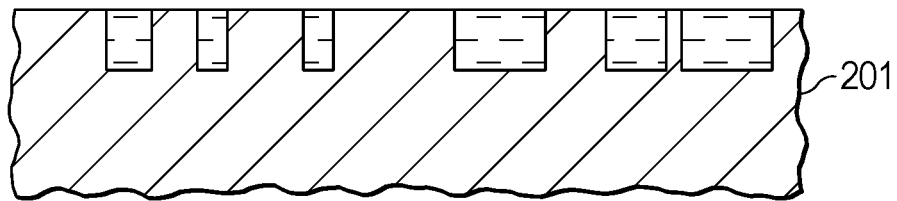

FIGS. 5A and 5B illustrate an example of tuned application of pigmented fluid using apparatus and methods according to this disclosure. For convenience of cross-reference, elements of FIGS. 5A and 5B described elsewhere are numbered according to their previous description.

Referring to the non-limiting example of FIG. 5A, a section of an icon layer 201 is shown in the figure, wherein icon layer has a plurality of relief structures of varying widths, including wide recess 505 and narrow recess 507. Assuming equivalent depths, the difference in width between wide recess 505 and narrow recess 507 implies that a greater volume of pigmented fluid is required to fill wide recess 505 as compared to narrow recess 507. Thus, when applying pigmented fluid at a constant volume per area across an icon layer which has a first region in which the recesses are fewer or narrower (such as narrow recess 507) and a second region in which more of the area is recessed (either through a greater number of recesses and/or wider or deeper recesses), there is a significant probability that the single ink density is either insufficient to fill the recesses of the "thirstier" portion of the icon layer (which can result in washed out, or less saturated colors) in which the recess volume is greater, or there is a significant excess of pigmented fluid in the less recesses portion of the icon layer, resulting in wastage of materials and more excess ink which needs to be properly removed.

Recognizing that the ink density required to achieve a desired level of fill can vary across the surface of icon layer 201, certain embodiments according to the present application leverage the fact that micro-scale jet dispensers (for example, micro-scale jet dispenser 305) suitable for use in embodiments according to this disclosure can dispense droplets of pigmented material of varying size, to modulate the ink density of pigmented fluid across the surface of icon layer in response to one or more of known features of an icon layer (for example, knowing which portions of the icon structure have a greater recess volume to fill), a predetermined design parameter (for example, to create a unique design or fill recesses to a level sufficient achieve a desired color for an icon), or feedback from one or more inspection cameras (for example, inspection camera 310 in FIG. 3) indicating a need for more or less pigmented fluid in a given area As shown in the illustrative example of FIG. 5A, pigmented fluid 509 is applied at a first ink density in a first region 511 of icon layer 201, where the relief structure of icon layer 201 is less "thirsty" and less fluid is required to sufficiently fill the recesses of first region 511. Similarly, pigmented fluid 509 is applied at a second ink density (represented by a higher fill level) in a second region 513, where the relief structure of icon layer 201 is "thirstier," and requires comparatively more pigmented fluid to achieve an equivalent level of fill.

As shown in FIG. 5B, after applying the pigmented fluid at area-specific ink densities, icon layer 201 is bladed, and depending on the pigmented fluid used, may be exposed to radiation (for example, ultraviolet light) to cure and crosslink the pigmented fluid, thereby forming a complete, ready-to-use icon layer.

Figure 6A:
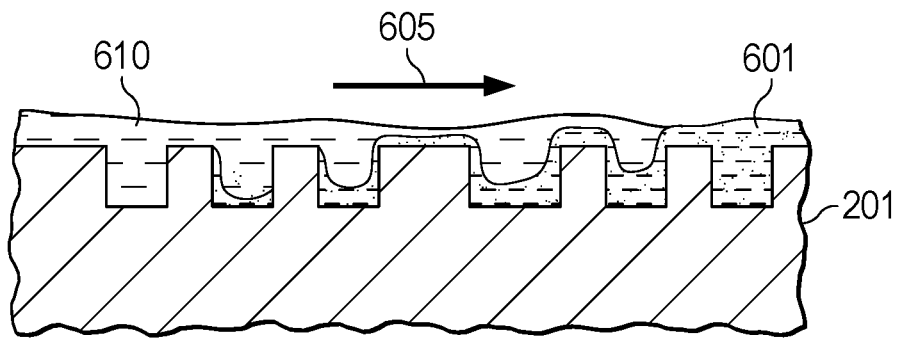
FIGS. 6A and 6B illustrate an example of precision inking recesses of a three-dimensional icon layer to produce a vignette effect according to various embodiments of this disclosure.
Figure 6B:
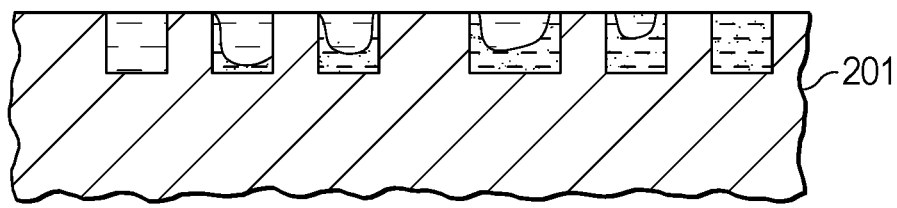

FIGS. 6A and 6B illustrate an example of providing a vignette effect across icons of a recessed icon layer by spatially modulating the ink densities of two or more pigmented fluids prior to blading, and if necessary, curing of the pigmented fluid. For convenience of cross-reference, elements of FIGS. 5A and 5B described elsewhere are numbered according to their previous description.

As used in this disclosure, the expression "vignette effect" encompasses a progressive (i.e., without a clear border) change in the saturation of one or more colors across the field of an icon layer. Examples of vignette effects, include, without limitation, where a repeating pattern of icons is formed such that icons on a first side of an icon layer are a deep red, but progressively fade to invisibility towards a second side of an icon layer. Further examples of vignette effects include superpositions of two vignette effects. For example, in addition to inking an icon layer with a repeating pattern of icons which fades from deep red to invisibility in the towards a second side, the icon layer could also be inked to provide a second vignette effect, wherein icons on the second side of the icon layer are a deep blue, and the depth of blue fades towards the first side. The superposition of the above-described vignette effects creates an icon layer in which the color of the icons appears to be continually and progressively changing between the first and second sides of the icon layer. From a performance perspective, this is desirable, in that it adds a further layer of technical and manufacturing challenges to malicious actors attempting to create counterfeit products, in that, in addition to the significant technical and practical challenges with either creating a casting master for an icon layer, or otherwise obtaining icon layer material, counterfeiters would have to achieve the process control necessary to modulate micro-volumes of pigmented material across a small area. From a performance perspective, being able to provide vignette effects in micro-optic security devices is, at a minimum, doubly desirable in that it allows for customization of micro-optic devices using a common icon layer and can also produce more visually engaging micro-optic device. As skilled artisans will appreciate, for a user-level indicia of authenticity to be effective, it has to be noticed by the user. Imbuing designs with additional visual "pop" through color changes enhances visual engagement, and by implication, makes the optical security device more effective as a first-level anti-counterfeiting measure.

Referring to the explanatory example of FIG. 6A, the techniques for spatially modulating the ink density of a pigmented fluid described with reference to FIGS. 5A and 5B can be adapted to provide vignette effects in an icon layer 201. As shown in FIG. 6A, icon layer 201 is initially inked with a first pigmented fluid 601. Certain embodiments according to the present disclosure leverage the fact that micro-scale jet dispensers can both dispense very small volumes of fluid, and, at the same time, modulate the size of the dispensed droplets of fluid. As shown in FIG. 6A, the ink density of first pigmented fluid 601 progressively increases in a first direction across icon layer 201 in a first direction 605. Subsequent to being inked with first pigmented fluid 601, icon layer 201 is inked with second pigmented fluid 610, which in some embodiments, is of a contrasting color to first pigmented fluid 601. As shown in FIG. 6A, the ink density of second pigmented fluid 610 decreases across the surface in first direction 605. Thus, in this example, there is a superposition of the vignetting of first pigmented fluid 601 and the vignetting of second pigmented fluid 610, which, when projected by a focusing layer, makes the icons of icon layer 201 appear to progressive and smoothly change from the color of second pigmented fluid 610 to that of first pigmented fluid 601 in first direction 605.

As shown in FIG. 6B, after being inked, icon layer 201 may be doctor bladed and cured to produce a finished icon layer for a micro-optic device.

The enhanced spatial and volume control provide by certain embodiments according to this disclosure permits customization, serialization and the embedding of unique data not possible with flooding and blading the full surface of an icon layer.

Figure 7A:
FIGS. 7A-7C illustrate an example of precision inking recesses of a three-dimensional icon layer to provide a machine-readable code with dynamic features according to some embodiments of this disclosure.
Figure 7B:
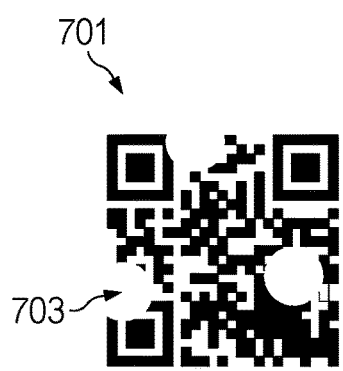
Figure 7C:
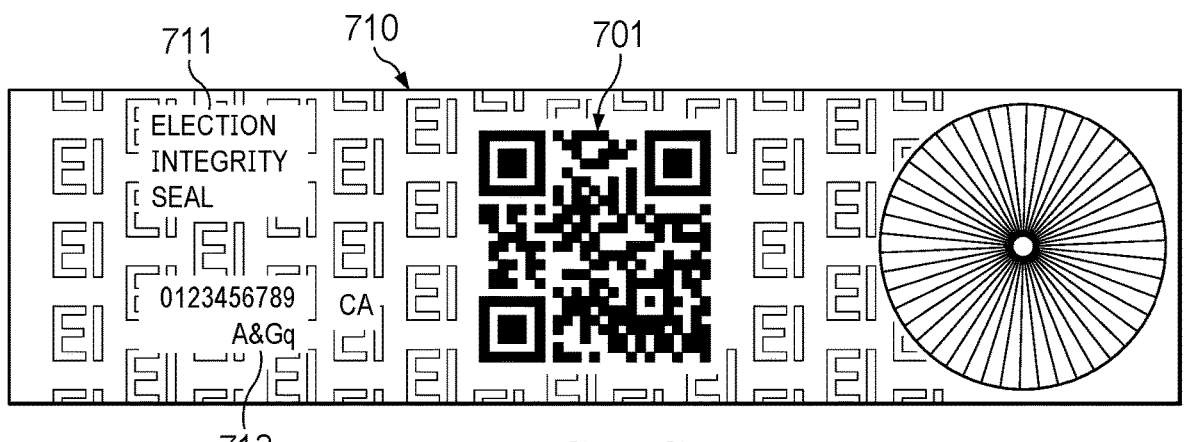

FIGS. 7A-7C illustrate an example of icon-layer level serialization and customization utilizing apparatus and methods according to this disclosure. For convenience of cross reference, elements common to more than one of FIGS. 7A-7C are numbered similarly. Referring to the illustrative example of FIG. 7A, a two-dimensional barcode, also known as a quick-response or ("QR") code 701 is shown in the figure. For certain applications, such as where the micro-optic security device is small (for example, less than 1 cm wide), likely to be subjected to wear and possible soiling or damage in the field (for example, as part of a micro-optic device incorporated into a banknote) or the serialization data needs to be read by a wide range of apparatus, QR codes are particularly suitable in that they incorporate high levels of redundancy in the encoded data (meaning damaged codes can be read), and can be read by a variety of apparatus, including digital cameras and scanning laser bar code readers. Referring to the illustrative example of FIG. 7A, the full pattern of QR code 701 is shown in the figure. According to various embodiments, standard QR code patterns allow for encoding up to 3 kilobytes of data, or lesser quantities of data, with one or more of coarser resolution or higher levels of redundancy and error correction.

Referring to the explanatory example of FIG. 7B, a first view 705 of QR code 701, as projected through a layer of focusing elements (for example, focusing elements 105 in FIG. 1) is shown in the figure. Depending on the scale and repeat structure of the icon layer relative to that of an array of focusing layer, the content of an icon layer may be visible through the array of focusing elements in at least one of two ways. First, where the scale and repeat interval of the icon layer is in phase (or closely phased with) that of the scale and repeat interval of the focusing elements of an array of focusing elements, synthetic magnification occurs, wherein the viewpoint, and a plurality of focusing elements and a plurality of are aligned such that the individual icons are projected in phase with each other, and a multiplicity of otherwise invisible (to the human eye) icon structures become visible through aggregated, in phase projection through the array of focusing elements. According to certain embodiments, synthetic magnification of a given icon structure may only be possible across a subset of the possible viewing angles.

However, where the scale and/or repeat interval of the icon layer is not closely phased with the scale and repeat interval of the focusing elements, synthetic magnification does not occur, and instead, the content of the icon layer is projected as a static image with minimal magnification. As shown with reference to FIG. 7B, in certain embodiments according to the present disclosure, an icon layer may be inked with a unique QR code 701 such that content in a first portion of the icon layer is not closely phased with focusing elements (for example, an array of microlenses). Accordingly, content in this first area is static and can be read by a camera, scanner or other QR code reader across a wide range of angles. Additionally, leveraging the fact that QR codes can be produced with high levels of redundancy and error correction, meaning that not all of the code has to be visible to be successfully read by a machine reader, a second portion (including circular sub-region 703) of the icon layer is inked such that the icon structures are closely phased with focusing elements of an array of focusing elements, and projects a synthetic image. According to certain embodiments, the net effect of inking QR code on an icon layer with regions that are phased with the focusing elements, and additional regions which are not in phase with the focusing elements. In some embodiments, the net effect of inking an icon layer with a QR code as described is to produce a QR code which is both dynamic in the sense that human viewers can see the synthetically magnified portions of the QR code appear and disappear as QR code 701 moves through different viewing angles, and, at the same time, reliably machine readable, in that the portions of the icon layer which are not in phase with a layer of focusing elements are visible across a wide range of viewing angles.

FIG. 7C illustrates an example of an optical security device 710 with an icon layer inked to include a QR code 701. In addition to QR code 701, apparatuses and techniques according to the present disclosure may be used to form additional unique indicia within an icon layer of the micro-optic device. For example, an image file used to guide a micro-scale jet dispenser may be configured to define the pattern for one or more of a jurisdiction-specific seal 711 or a serial number 713.

As noted elsewhere in this disclosure, the technical challenges associated with manufacturing micro-optic security devices which incorporate an icon layer having material of different pigmentations include, without limitation, significant registration challenges, given the small size of the icon layer. Achieving accurate registration between regions of multiple pigmented fluid requires controlling a plurality of parameters, including, without limitation, the position of the jets of the micro-scale jet dispensers relative to the surface of image layer, the position of the micro-scale jet dispenser relative to the pigmented fluids have already been applied, and factors affecting the coverage and flow of the pigmented fluid, including without limitation, ink density and ink temperature. Managing these multiple interrelated variables may present significant operational challenges, in that the interplay between variables (for example, coverage and volume) may be implementation specific and not amenable to predefined rules. By creating a closed feedback loop (for example, as described with reference to FIG. 4 of this disclosure) in which image data indicating the extent to which the current application parameters are laying down pigmented fluid in a manner that conforms to a specified design.

FIGS. 8A-8E illustrate aspects of using image data feedback to manage the plurality of variables associated with inking an icon layer in a way that achieves accurate registration. For convenience of cross-reference, elements common to more than one of FIGS. 8A-8E are numbered similarly.

Figure 8A:
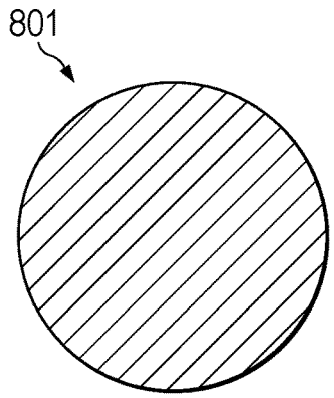
FIGS. 8A-8E illustrates an example of feedback-corrected precision inking of a three-dimensional icon layer according to various embodiments of this disclosure.
Figure 8B:
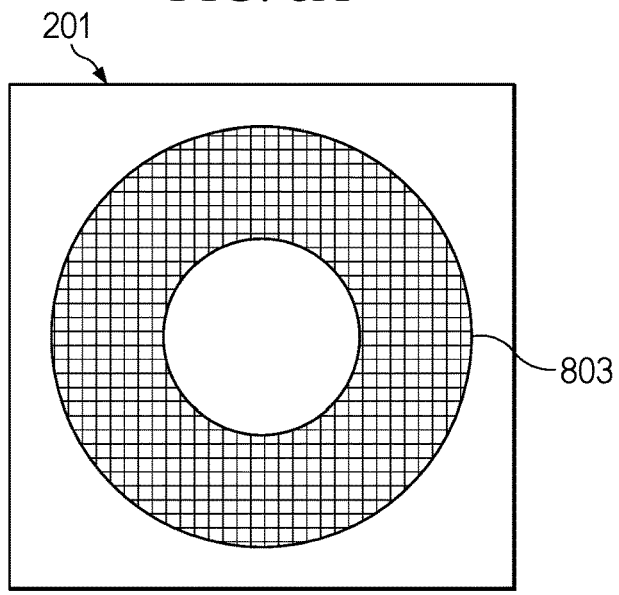
Figure 8C:
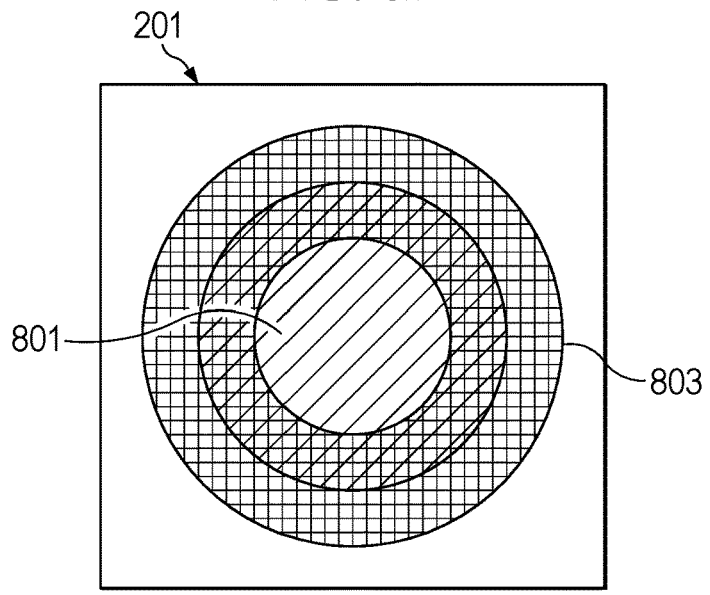
Figure 8D:
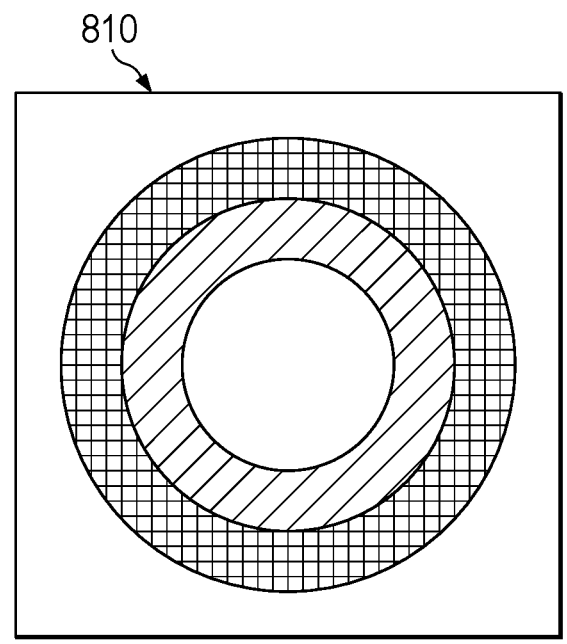
Figure 8E:
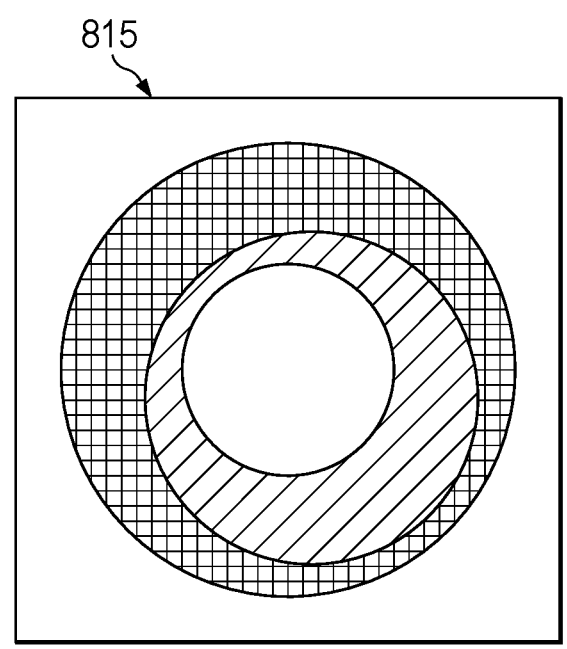

Referring to the illustrative example of FIG. 8A, a representation of a design 801 of pigmented fluid of a first color to be applied is shown in the figure. In this example, design 801 is to be applied symmetrically over the center of a circular region of an icon layer (for example, icon layer 201 in FIG. 2). FIG. 8B provides a representation of the section 803 of icon layer 201 to which the pigmented fluid is to be applied. As shown in the figure, section 803 of icon layer 201 comprises an annular section which has already been inked with pigmented material of a second color. In this example, design 801 is inked over section 803 in order to create a vignette or color mixing effect, wherein the center of design 801 aligns with the center of section 803, such as shown in FIG. 8C. In some embodiments, the contrast between the first color and second color may be such that image data of the unbladed icon layer may not provide a clear indication of the quality of registration between design 801 and section 803. Accordingly, in some embodiments, image data may be obtained from downstream inspection cameras, which obtain image data of icon layer 201 after excess pigmented fluid has been bladed from the surface of the icon layer. FIG. 8D provides an example of post-blading image data 810 showing successful and correct registration of design 801 relative to section 803. FIG. 8E illustrates an example of post-blading image data 815 showing incorrect registration of design 801 relative to section 803. In the example of FIG. 8E, image data 815 shows that while design 801 is the correct size, its center is below that of section 803. Accordingly, a controller of the inking apparatus (for example, controller 401 in FIG. 4 would, in response to the data provided in image data 815, refine one or more of an image file or raster file to correct the application point for design 801 to bring it in register with section 803.

Examples of methods for inking a three-dimensional micro-optic structure according to the present disclosure include methods including jetting a first volume of a first radiation-curable ink having a first pigment concentration to a first portion of a three-dimensional icon layer, wherein the first portion of the three-dimensional icon layer has a first volumetric fill requirement, jetting a second volume of the first radiation-curable ink to a second portion of the three-dimensional icon layer, wherein the second portion of the three-dimensional icon layer has a second volumetric fill requirement, blading excess radiation-curable ink from the three-dimensional icon layer and radiation curing remaining radiation-curable ink.

Examples of methods for inking a three-dimensional micro-optic structure according to the present disclosure include methods wherein the first pigment concentration is between 20 and 70 percent by weight.

Examples of methods for inking a three-dimensional micro-optic structure according to the present disclosure include methods including subsequent to blading the excess radiation-curable ink from the three-dimensional icon layer, obtaining image data of the radiation-curable ink applied to the first portion, and dynamically adjusting the first volume of the radiation-curable ink based on the image data.

Examples of methods for inking a three-dimensional micro-optic structure according to the present disclosure include methods including responsive to the image data indicating one or more of specific patterning of the first radiation-curable ink, a quantity of radiation-curable ink outside of the first portion falling short of a first threshold area at a specified image density, or a quantity of radiation-curable ink falling short of an ink density associated with a specific color, increasing the first volume.

Examples of methods for inking a three-dimensional micro-optic structure according to the present disclosure include methods including adjusting a temperature of unjetted radiation-curable first ink based on the image data.

Examples of methods for inking a three-dimensional micro-optic structure according to the present disclosure include methods including subsequent to jetting the first volume of the first radiation-curable ink, jetting a third volume of a second radiation-curable ink to at least part of the first portion, wherein the second radiation-curable ink contrasts with the first radiation-curable ink across at least a portion of the electro-magnetic spectrum.

Examples of methods for inking a three-dimensional micro-optic structure according to the present disclosure include methods wherein the third volume of the second radiation-curable ink varies progressively within the at least part of the first portion to produce a vignette effect.

Examples of apparatuses for inking a three-dimensional micro-optic structure according to the present disclosure include an apparatus including a jet dispenser and a controller communicatively connected to the jet dispenser, wherein the controller is configured to control the jet dispenser to dispense a first volume of a first radiation-curable ink having a first pigment concentration to a first portion of a three-dimensional icon layer, wherein the first portion of the three-dimensional icon layer has a first volumetric fill requirement, and control the jet dispenser to dispense a second volume of the first radiation-curable ink to a second portion of the three-dimensional icon layer, wherein the second portion of the three-dimensional icon layer has a second volumetric fill requirement.

Examples of apparatuses for inking a three-dimensional micro-optic structure according to the present disclosure include an apparatus including an inspection camera configured to obtain image data of the three-dimensional icon layer, wherein the controller is further configured to dynamically adjust the first volume of the radiation curable ink based on the obtained image data.

Examples of apparatuses for inking a three-dimensional micro-optic structure according to the present disclosure include an apparatus wherein the controller is configured to, responsive to the image data indicating one or more of specific patterning of the radiation-curable ink, a quantity of radiation-curable ink outside of the first portion falling short of a first threshold area at a specified image density, or a quantity of radiation-curable ink falling short of an ink density associated with a specific color, increase the first volume.

Examples of apparatuses for inking a three-dimensional micro-optic structure according to the present disclosure include an apparatus wherein the controller is further configured to adjust a temperature of undispensed first radiation-curable ink based on the image data.

Examples of apparatuses for inking a three-dimensional micro-optic structure according to the present disclosure include an apparatus wherein the controller is further configured to, subsequent to dispensing the first volume of the first radiation-curable ink, dispense a third volume of a second radiation-curable ink to at least part of the first portion, wherein the second radiation-curable ink contrasts with the first radiation-curable ink across at least a portion of the electro-magnetic spectrum.

Examples of apparatuses for inking a three-dimensional micro-optic structure according to the present disclosure include an apparatus wherein the third volume of the second radiation-curable ink varies progressively within the at least part of the first portion to produce a vignette effect.

Examples of apparatuses for inking a three-dimensional micro-optic structure according to the present disclosure include an apparatus wherein the third volume of the second radiation-curable ink is applied as one or more of a pattern or machine-readable code.

Examples of micro-optic security devices according the present disclosure include a substrate and a three-dimensional icon layer formed on the substrate, the three-dimensional icon layer comprising a first plurality of recesses in a first portion, and a second plurality of recesses in a second portion, wherein recesses of the first plurality of recesses are filled with a radiation-curable ink having a first pigment concentration to a first volumetric fill requirement, wherein recesses of the second plurality of recesses are filled with the radiation-curable ink to a second volumetric fill requirement.

Examples of micro-optic security devices according to the present disclosure include micro-optic security devices wherein the first pigment concentration is between 20 and 70 percent by weight.

Examples of micro-optic security devices according to the present disclosure include a third volume of a second radiation-curable ink in at least part of the first portion, wherein the second radiation-curable ink contrasts with the first radiation-curable ink across at least a portion of the electro-magnetic spectrum.

Examples of micro-optic security devices according to the present disclosure include micro-optic security devices wherein the third volume of the second radiation-curable ink varies progressively within the at least part of the first portion to produce a vignette effect.

Examples of micro-optic security devices according to the present disclosure include micro-optic security devices wherein the third volume of the second radiation-curable ink is applied as one or more of a pattern or machine-readable code.

Examples of micro-optic security devices according to the present disclosure include a layer of focusing elements disposed on the substrate, such that when viewed through the layer of focusing elements, the three-dimensional image projects a dynamic image, wherein an appearance of the machine-readable code exhibits dynamic changes according to viewing angle, wherein the dynamic changes do not prevent the machine-readable code from being read by a code reader.

The present disclosure should not be read as implying that any particular element, step, or function is an essential element, step, or function that must be included in the scope of the claims. Moreover, the claims are not intended to invoke 35 U.S.C. § 112(f) unless the exact words "means for" are followed by a participle.

What is claimed is:

1. A method for inking a three-dimensional micro-optic structure, the method comprising:
   jetting a first volume of a first radiation-curable ink having a first pigment concentration to a first portion of a three-dimensional icon layer, wherein the first portion of the three-dimensional icon layer has a first volumetric fill requirement, wherein the first volumetric fill requirement indicates a quantity of radiation-curable ink required to fill a relief structure of the first portion of the three-dimensional icon layer with radiation-curable ink of a given pigment concentration;
   jetting a second volume of the first radiation-curable ink to a second portion of the three-dimensional icon layer, wherein the second portion of the three-dimensional icon layer has a second volumetric fill requirement, wherein the second volumetric fill requirement indicates a quantity of radiation-curable ink required to fill a relief structure of the second portion of the three-dimensional icon layer with radiation-curable ink of a given pigment concentration, and wherein the second volumetric fill requirement differs from the first volumetric fill requirement;
   blading an excess amount of the first radiation-curable ink from the three-dimensional icon layer; and
   radiation curing a remaining volume of the first radiation-curable ink.

2. The method of claim 1, wherein the first pigment concentration is between 20 and 70 percent by weight.

3. The method of claim 1, further comprising:
   subsequent to blading the excess amount of the first radiation-curable ink from the three-dimensional icon layer, obtaining image data of the first radiation-curable ink applied to the first portion of the three-dimensional icon layer;
   obtaining, from the image data, a value of a parameter indicating coverage of the first portion of the three-dimensional icon layer by the first radiation-curable ink; and
   dynamically adjusting the first volume of the first radiation-curable ink based on the image data.

4. The method of claim 3, further comprising:
   responsive to the image data indicating one or more of: a quantity of radiation-curable ink outside of the first portion of the three-dimensional icon layer falling short of a threshold area at a specified image density, or a quantity of the first radiation-curable ink falling short of an ink density associated with a specific color, increasing the first volume of the first radiation-curable ink.

5. The method of claim 3, further comprising adjusting a temperature of unjetted first radiation-curable ink based on the value of the parameter indicating coverage of the first portion of the three-dimensional icon layer obtained from the image data.

6. The method of claim 1, further comprising:
subsequent to jetting the first volume of the first radiation-curable ink, jetting a third volume of a second radiation-curable ink to at least part of the first portion of the three-dimensional icon layer,
wherein the second radiation-curable ink contrasts with the first radiation-curable ink across at least a portion of an electro-magnetic spectrum.

7. The method of claim 6, wherein the third volume of the second radiation-curable ink varies progressively within the at least part of the first portion of the three-dimensional icon layer to produce a vignette effect.

8. An apparatus, comprising:
a jet dispenser; and
a controller connected to the jet dispenser, wherein the controller is configured to:
control the jet dispenser to dispense a first volume of a first radiation-curable ink having a first pigment concentration to a first portion of a three-dimensional icon layer, wherein the first portion of the three-dimensional icon layer has a first volumetric fill requirement, wherein the first volumetric fill requirement indicates a quantity of radiation-curable ink required to fill a first relief structure of the first portion of the three-dimensional icon layer with radiation-curable ink of a given pigment concentration; and
control the jet dispenser to dispense a second volume of the first radiation-curable ink to a second portion of the three-dimensional icon layer, wherein the second portion of the three-dimensional icon layer has a second volumetric fill requirement, wherein the second volumetric fill requirement indicates a quantity of radiation-curable ink required to fill a relief structure of the second portion of the three-dimensional icon layer with radiation-curable ink of a given pigment concentration, and wherein the second volumetric fill requirement differs from the first volumetric fill requirement.

9. The apparatus of claim 8, further comprising:
an inspection camera configured to obtain image data of the three-dimensional icon layer,
wherein the controller is further configured to;
obtain, from the image data, a value of a parameter indicating coverage of the first portion of the three-dimensional icon layer by the first radiation-curable ink, and
dynamically adjust the first volume of the first radiation-curable ink based on the obtained image data.

10. The apparatus of claim 9, wherein the controller is further configured to, responsive to the obtained image data indicating one or more of: a quantity of radiation-curable ink outside of the first portion of the three-dimensional icon layer falling short of a threshold area at a specified image density, or a quantity of the first radiation-curable ink falling short of an ink density associated with a specific color, increase the first volume of the first radiation-curable ink.

11. The apparatus of claim 9, wherein the controller is further configured to adjust a temperature of undispensed first radiation-curable ink based on the value of the parameter indicating coverage of the first portion of the three-dimensional icon layer obtained from the image data.

12. The apparatus of claim 8, wherein the controller is further configured to:
subsequent to dispensing the first volume of the first radiation-curable ink, dispense a third volume of a second radiation-curable ink to at least part of the first portion of the three-dimensional icon layer,
wherein the second radiation-curable ink contrasts with the first radiation-curable ink across at least a portion of an electro-magnetic spectrum.

13. The apparatus of claim 12, wherein the third volume of the second radiation-curable ink varies progressively within the at least part of the first portion of the three-dimensional icon layer to produce a vignette effect.

14. The apparatus of claim 12, wherein the third volume of the second radiation-curable ink is applied as one or more of a pattern or machine-readable code.

15. A micro-optic security device comprising:
a substrate; and
a three-dimensional icon layer formed on the substrate, the three-dimensional icon layer comprising a first plurality of recesses in a first portion, and a second plurality of recesses in a second portion,
wherein recesses of the first plurality of recesses are filled with a first radiation-curable ink having a first pigment concentration to a first volumetric fill requirement, wherein the first volumetric fill requirement indicates a quantity of radiation-curable ink required to fill a first relief structure of the first portion of the three-dimensional icon layer with radiation-curable ink of a given pigment concentration, and
wherein recesses of the second plurality of recesses are filled with the first radiation-curable ink to a second volumetric fill requirement, wherein the second volumetric fill requirement indicates a quantity of radiation-curable ink required to fill a relief structure of the second portion of the three-dimensional icon layer with radiation-curable ink of a given pigment concentration, and wherein the second volumetric fill requirement differs from the first volumetric fill requirement.

16. The micro-optic security device of claim 15, wherein the first pigment concentration is between 20 and 70 percent by weight.

17. The micro-optic security device of claim 15, further comprising:
a third volume of a second radiation-curable ink in at least part of the first portion of the three-dimensional icon layer,
wherein the second radiation-curable ink contrasts with the first radiation-curable ink across at least a portion of an electro-magnetic spectrum.

18. The micro-optic security device of claim 17, wherein the third volume of the second radiation-curable ink varies progressively within the at least part of the first portion of the three-dimensional icon layer to produce a vignette effect.

19. The micro-optic security device of claim 17, wherein the third volume of the second radiation-curable ink is applied as one or more of a pattern or machine-readable code.

20. The micro-optic security device of claim 19, further comprising:
a layer of focusing elements disposed on the substrate, such that when viewed through the layer of focusing elements, the three-dimensional icon layer projects a dynamic image, wherein an appearance of the machine-readable code exhibits dynamic changes according to viewing angle, wherein the dynamic changes do not prevent the machine-readable code from being read by a code reader.

\* \* \* \* \*